United States Patent [19]

Honda et al.

[11] Patent Number: 4,484,883
[45] Date of Patent: Nov. 27, 1984

[54] MULTI-LAYER EXTRUSION DIE

[75] Inventors: Yukio Honda; Hitoshi Komatsu; Yoshiyuki Mihara, all of Chiba, Japan

[73] Assignee: Idemitsu Petrochemical Co., Ltd., Tokyo, Japan

[21] Appl. No.: 482,130

[22] Filed: Apr. 5, 1983

[30] Foreign Application Priority Data

Jun. 7, 1982 [JP] Japan .................................. 57-97338

[51] Int. Cl.³ ................................................ B29F 3/08
[52] U.S. Cl. .................................... 425/462; 264/40.6; 264/173; 425/133.1; 425/144; 425/379 R; 425/467
[58] Field of Search ............ 425/143, 144, 462, 131.1, 425/133.1, 380, 379 R, 467, 378 R; 264/40.6, 173

[56]  References Cited

U.S. PATENT DOCUMENTS

| | | | |
|---|---|---|---|
| 3,446,884 | 5/1969 | Miller et al. ..................... | 264/209.4 |
| 3,461,496 | 8/1969 | Winstead ......................... | 425/379 R |
| 3,525,125 | 8/1970 | Berger et al. .................... | 425/379 R |
| 3,588,987 | 6/1971 | Korostoff et al. ................ | 425/461 |
| 3,635,624 | 1/1972 | Nakakoshi et al. .............. | 425/133.1 |
| 3,809,515 | 5/1974 | Farrell ............................... | 425/462 |
| 3,856,448 | 12/1974 | Iijima et al. ...................... | 425/462 |
| 3,860,372 | 1/1975 | Newman, Jr. ..................... | 425/133.1 |
| 3,933,958 | 1/1976 | Hinrichs .......................... | 264/40.6 |
| 3,950,118 | 4/1976 | Adair ................................ | 264/40.6 |
| 4,298,325 | 11/1981 | Cole .................................. | 425/462 |

FOREIGN PATENT DOCUMENTS

| | | | |
|---|---|---|---|
| 2140194 | 2/1973 | Fed. Rep. of Germany ...... | 425/380 |
| 54-4555 | 1/1979 | Japan . | |
| 54-5833 | 3/1979 | Japan . | |
| 56-5750 | 1/1981 | Japan ............................... | 264/171 |

Primary Examiner—Jeffery Thurlow
Attorney, Agent, or Firm—Flynn, Thiel, Boutell & Tanis

[57] ABSTRACT

A multi-layer extrusion die wherein a temperature control mechanism for heating or cooling an inner layer resin is provided inside an inner layer resin flow path, and resins flowing through respective resin flow paths are each heated to a suitable temperature so as to eliminate possibilities of occurrence of burning of the resin and the like.

11 Claims, 3 Drawing Figures

MULTI-LAYER EXTRUSION DIE

BACKGROUND OF THE INVENTION

1. Field of the Invention

This invention relates to a multi-layer extrusion die for use in simultaneously extruding thermoplastic resins of two or more types to obtain a multi-layer tubular resin.

2. Description of the Prior Art

A multi-layer tubular resin such as a multi-layer film is formed such that a plurality of resins different in performance from one another are combined to provide a product having a new performance, in which characteristics of the respective resins are efficiently used. Typically, the respective resins to be combined together have melting points and thermal resistances different from one another.

As shown in FIG. 1, the conventional multi-layer extrusion die used for forming the multi-layer film and the like as described above comprises an inner layer resin flow path 1 and an outer layer resin flow path 2 surrounding the inner layer resin flow path 1. Both an inner layer resin and an outer layer resin are heated from outside by a heater 4 provided on the outer periphery of a die body 3. For example, a resin having a high melting point is caused to flow through the outer layer resin flow path 2 disposed closer to the heater 4 and a resin having a low melting point is caused to flow through the inner layer resin flow path 1 disposed farther from the heater 4.

However, when the conventional multi-layer extrusion die as described above is used, such disadvantages have been presented that burning of resin occurs, a product having an unsatisfactory surface profile is obtained or non-formability is sometimes resulted because the inner layer resin having a low melting point is heated to more than a proper temperature. Further, in the case of forming a laminated film by use of a resin having a high melting point as an inner layer resin and a resin having a low melting point as an outer layer resin, the outer layer resin is overheated to a great extent in order to heat the inner layer resin, thus resulting in a by far larger problem.

To overcome this problem, there has been made a contrivance that the flow path for the resin having a low melting point (a resin being low in heat resistance) is made narrow and the retention time of the inner layer resin in the die is shortened. However, there have been restrictions due to the forming, thereby preventing obtaining of satisfactory results.

It has been proposed that a heat transfer medium for heating is circulated through an intermediate portion between the inner layer resin flow path and the outer layer resin flow path (Japanese Patent "Kokoku (Post-Exam. Publn.)" No. 5833/79 and Japanese Utility Model "Kokoku (Post-Exam. Publn.)" No. 22622/80), and that a heat insulating space is formed between a die for the inner layer and a die for the outer layer and these two dies are controlled in temperature independently of each other (Japanese Utility Model "Kokoku (Post-Exam. Publn.)" No. 4555/79).

However, with these multi-layer extrusion dies thus proposed, it is difficult to simplify the construction and the temperature control should not necessarily be easily effected.

SUMMARY OF THE INVENTION

The present invention has as its object the provision of a multi-layer extrusion die capable of being simplified in construction, easily effecting the temperature control and eliminating possibilities of occurrence of burning of resin and the like.

To achieve the above-described object, the present invention contemplates that a temperature control mechanism for heating or cooling the inner layer resin is provided inside the inner layer resin flow path. More specifically, heretofore, there have been made no contrivance about means to be provided inside the inner layer resin flow path. However, according to the present invention, a portion inwardly of the inner layer resin flow path is actively utilized. For example, a heating means as the temperature control mechanism is provided inside the inner layer resin flow path and a resin having a high melting point is caused to flow through the inner layer resin flow path, while, a resin having a low melting point is caused to flow through the outer layer resin flow path, so that the resin having a low melting point may not be excessively heated by the heat dissipation of the resin having a high melting point to the side of the outer periphery of the die. Or, a cooling means as the temperature control mechanism is provided inside the inner layer resin flow path and a resin having a low melting point is caused to flow through the inner layer resin flow path, while, a resin having a high melting point is caused to flow through the outer layer resin flow path, whereby the heating is effected from outside of the die. In this case, the inner layer resin is suitably cooled by the cooling means, so that the inner layer resin may not be excessively heated, to thereby achieve the above-described object.

DETAILED DESCRIPTION OF THE PREFERRED EMBODIMENTS

Figure 2:
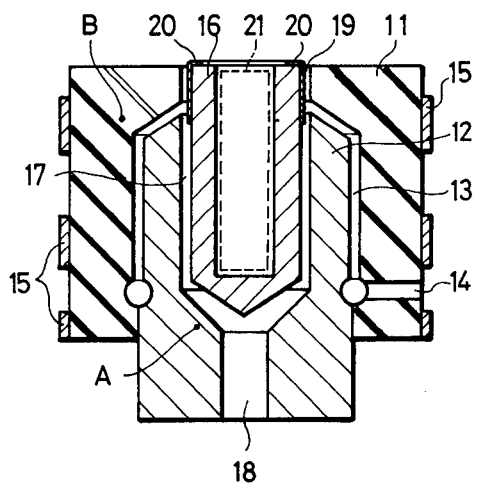
FIG. 2 is a sectional view showing the arrangement of one embodiment of the multi-layer extrusion die according to the present invention.

FIG. 2 shows one embodiment of the multi-layer extrusion die according to the present invention. In this drawing, an intermediate die 12 is coupled into a die body 11 having a substantially columnar inner peripheral surface, and an outer layer resin flow path 13 is formed by a space between the aforesaid inner peripheral surface and the outer peripheral surface of the intermediate die 12. This outer layer resin flow path 13 is communicated with a flow-in port 14 for an outer layer resin penetrated through a side wall of the die body 11, and a resin having a low melting point such as low-density polyethylene is continuously supplied into the outer layer resin flow path 13 through this flow-in port 14.

Furthermore, an auxiliary heating means 15, such as a band heater or a ribbon heater, as being a temperature control mechanism is provided on the outer peripheral surface of the die body 11. This auxiliary heating means 15 is adapted to prevent the outer layer resin from being excessively lowered in temperature due to the heat dissipation on the outer peripheral portion of the die body 11. Fundamentally, it is preferable to effect the temperature control, however, depending on the types of the outer layer resins to be applied, the auxiliary heating means 15 itself is not needed. Further, when the outer layer resin has a very low melting point as compared with the inner layer resin, the auxiliary heating means 15 may be replaced by a cooling means.

The intermediate die 12 is formed with a columnar inner peripheral surface opening at the top end thereof as shown in the drawing. A mandrel 16 is coupled into this inner peripheral surface, and an inner layer resin flow path 17 is formed by a space between the outer peripheral surface of the mandrel 16 and the aforesaid inner peripheral surface. The inner layer resin flow path 17 is communicated with an inner layer resin flow-in port 18 penetrated at the bottom end of the intermediate die 12 as shown in the drawing. A resin having a high melting point such as high-density polyethylene is continuously supplied into the inner layer resin flow path 17 through this flow-in port 18.

The inner layer resin flow path 17 and the outer layer resin flow path 13 join at a position close to an extrusion slit 19, whereby the inner layer resin and the outer layer resin are bonded in the die and extruded in a tubular form through the extrusion slit 19.

The peripheral surface of the mandrel 16 constituting the extrusion slit 19 and the top end downstream end face of the mandrel 16 adjacent to the extrusion slit 19 are applied thereto with an eutectoid film 20 of fluorine-containing compound grains and plating substance as necessary. This film 20 can prevent the resins, various additives, affected substances, and the like from adhering or being built up. The fluorine-containing compound grains used in the eutectoid film 20 of fluorine-containing compound grains and plating substance include tetrafluoroethylene, tetrafluoroethylene-hexafluoropropylene copolymer, graphite fluoride, etc. The plating substances used in the eutectoid film 20 include nickel, a nickel-cobalt alloy, a nickel-phosphorus alloy, a nickel-boron alloy, copper, tin, etc., and especially, it is preferable to use nickel alloys. A content of the fluorine-containing compound grain in the plating may be 5 to 50 weight percent, and may preferably be 10 to 40 weight percent in particular. Further, it is preferable that the plated surface is softened, molten and entirely covered by fluorocarbon resin.

A heating means 21 as a temperature control mechanism is provided in the mandrel 16. In other words, the heating means 21 is disposed inside the inner layer resin flow path 17, so that the inner layer resin can be heated from inside by the heating means 21. The heating means 21 may include a cartridge heater using one of various heater elements, and a unit, in which heating fluid is circulated.

Figure 1:
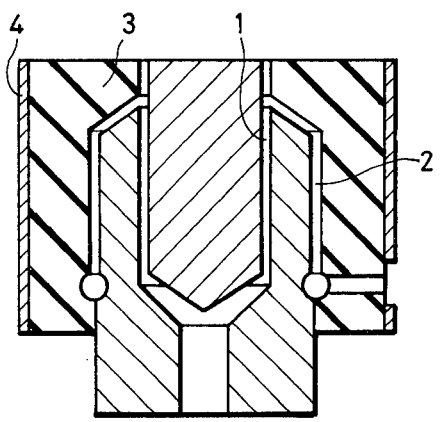
FIG. 1 is a sectional view showing the arrangement of the conventional multi-layer extrusion die.

In this embodiment having the above-described arrangement, since the outer layer resin flow path 13 is located at a position where the heat is easily dissipated, such advantages can be offered that the resin having a low melting point and flowing through the outer layer resin flow path 13 can avoid being excessively heated to be burnt, the surface profile of the film obtained is satisfactory, the rejection rate is reduced, continuous forming for a long period of time is practicable, and the productivity is improved. For example, by using high density polyethylene (density ... 0.955 g/cm³ and melt index ... 0.05 g/10 min) as the inner layer resin and low density polyethylene (density ... 0.920 g/cm³ and melt index ... 3.0 g/10 min) as the outer layer resin, and by setting the die temperature at a position indicated by reference character A in FIG. 2, adjacent the inner layer resin flow path 17 at 200° C. and the die temperature at a position indicated by reference character B in FIG. 2, adjacent the outer layer resin flow path 13 at 160° C., a double layer film having a thickness of 50 micron meter (inner layer:outer layer=4:1) was continuously formed for six months without an overhaul of the die, and no burning of resin occurred. In contrast thereto, in the case of forming the same resin as described above by use of the conventional multi-layer extrusion die as shown in FIG. 1, the burning of resin started to occur within two weeks, the burning of resin frequently occurred in two months, and it became impossible to continue forming.

Although this embodiment is very simplified in construction, it can effect the extrusion of a multi-layer film consisting of various resins different in melting point and heat resistance from one another. Particularly, if the auxiliary heating means 15 is used, it becomes easy to accurately maintain the outer layer resin at a proper temperature. Further, if the auxiliary heating means 15 as the heating means is replaced by a cooling means, even when a multi-layer film is formed from resins different in melting point and heat resistance from each other as in the case of an expandable resin with a non-expandable resin, the respective resins can be maintained at the most proper temperature (for example, a decomposition temperature of a blowing agent), so that a high quality multi-layer film can be formed from various resins which have heretofore been formed into a multi-layer film with difficulties. Moreover, the auxiliary heating means 15 or the cooling means replacing the auxiliary heating means 15 is disposed on the outer peripheral portion of the die body 11, whereby the handling it is simple and the temperature control is facilitated.

Figure 3:
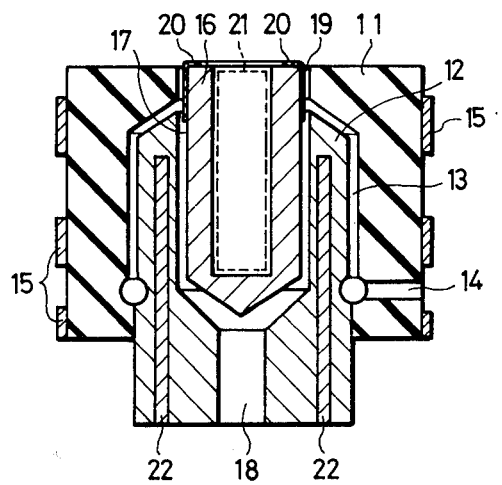
FIG. 3 is a sectional view showing the arrangement of an embodiment other than the above one.

As in an embodiment other than the preceding one, as shown in FIG. 3, if there is provided a heat insulating means 22 consisting of a heat insulating space, a heat insulating member and the circulation of a heat transfer medium being at a constant temperature, such advantages can be offered that the inner layer resin flow path 17 and the outer layer resin flow path 13 are not easily subject to the thermal influences from each other, and the inner layer resin and the outer layer resin can be easily thermally controlled independently of each other.

In working the invention, the heating means 21 as the temperature control mechanism may be replaced by a cooling means constituted by the circulation of cooling fluid or the like. In this case, if the resin having a high melting point is caused to flow through the outer layer resin flow path 13, the resin having a low melting point is caused to flow through the inner layer resin flow path 17 and the die body 11 is heated from outside by the heating means, then, even if the resin having a low melting point has a very low melting point and a very low heat resistance, a high quality multi-layer film can be obtained without causing the burning of resin.

The above-described embodiment has been of the type of bonding the inner resin onto the outer resin in the die, however, this may be of the type of bonding the inner resin onto the outer resin outside the die. The above-described embodiment need not necessarily be limited to the double layer film, but may be a multi-layer film of three or more layers by increasing flow paths in number in the die. Further, the products to be formed include not only the film but also tubular resins such as a pipe and a tube.

The eutectoid film 20 of fluorine-containing compound grains and plating substance need not necessarily be provided. However, the provision of the film 20 makes it possible to offer the advantage that the resins, additives, affected substances and the like are effectively prevented from adhering or being built up.

As has been described hereinabove, the present invention can provide a multi-layer extrusion die capable of being simplified in construction, easily controlled in temperature and eliminating possibilities of the burning of resin and the like.

What is claimed is:

1. A multi-layer extrusion die, for extruding thermoplastic resins to form a multi-layer tubular resin, wherein said die comprises: an inner and an outer layer resin flow path both of which are joined to each other in the vicinity of an extrusion slit; a first temperature control means disposed inside said inner layer resin flow path, a second temperature control means disposed outside said outer layer resin flow path; and a metallized film provided on a peripheral surface of said inner layer resin flow path.

2. A multi-layer extrusion die according to claim 1, wherein said first temperature control means is a heating means and said second temperature control means is an auxiliary heating means.

3. A multi-layer extrusion die according to claim 2, wherein a heat insulating means is provided between said inner layer resin flow path and said outer layer resin flow path.

4. A multi-layer extrusion die according to claim 1, wherein said first temperature control means is a cooling means and said second temperature control means is a heating means.

5. A multi-layer extrusion die according to claim 4, wherein a heat insulating means is provided between said inner layer resin flow path and said outer layer resin flow path.

6. A multi-layer extrusion die according to claim 1, wherein said first temperature control means is heating means and said second temperature control means is cooling means.

7. A multi-layer extrusion die according to claim 6, wherein a heat insulating means is provided between said inner layer resin flow path and said outer layer resin flow path.

8. A multi-layer extrusion die according to claim 1, wherein said die further comprises a central mandrel, an annular intermediate die part surrounding said central mandrel and separated therefrom by said inner resin flow path, an outer die body surrounding said intermediate die part and separated therefrom by said outer resin flow path, the peripheral surface of said central mandrel at the downstream end therof defining a wall of said extrusion slit, said metallized film being applied to the downstream end face of said mandrel adjacent said extrusion slit and extending onto the outer peripheral surface of said central mandrel from the downstream end thereof upstream toward the joinder of said inner and outer resin flow paths.

9. A multi-layer extrusion die according to claim 8, wherein said metallized film extends from radially adjacent said first temperature control means on said mandrel downstream end face toward said extrusion slit and from the latter along the outer peripheral surface of said mandrel upstream to just beyond said joinder of said outer and inner resin flow paths.

10. A multi-layer extrusion die according to claim 1, wherein said metallized film is an eutetoid film of fluorine-containing compound grains and plating substance and is applied to a portion of the peripheral surface of the inner layer resin flow path.

11. A multi-layer extrusion die according to claim 10, in which said fluorine-containing compound includes at least one of tetrafluoroethylene, tetrafluoroethylene-hexafluoropropylene copolymer and graphite fluoride, said plating substance being selected from the group consisting of nickel, a nickel-cobalt alloy, a nickel-phosphorus alloy, a nickel-born alloy, copper and tin, the content of said fluorine-containing compound grain in said plating being in the range of 5 to 50 percent by weight.

* * * * *

UNITED STATES PATENT AND TRADEMARK OFFICE
CERTIFICATE OF CORRECTION

PATENT NO. : 4 484 883

DATED : November 27, 1984

INVENTOR(S) : Yukio Honda, Hitoshi Komatsu and Yoshiyuki Mihara

It is certified that error appears in the above-identified patent and that said Letters Patent is hereby corrected as shown below:

Column 6, line 29; change "eutetoid" to ---eutectoid---.

Signed and Sealed this

Eighteenth Day of June 1985

[SEAL]

*Attest:*

DONALD J. QUIGG

*Attesting Officer*     *Acting Commissioner of Patents and Trademarks*